US005567942A

United States Patent [19]

Lee et al.

[11] Patent Number: 5,567,942

[45] Date of Patent: Oct. 22, 1996

[54] INFRARED ARRAY SENSOR SYSTEM

[75] Inventors: Jue H. Lee, Seoul; Seong M. Cho, Kyungki-do, both of Rep. of Korea

[73] Assignee: Goldstar Co., Ltd., Seoul, Rep. of Korea

[21] Appl. No.: 366,882

[22] Filed: Dec. 30, 1994

[30] Foreign Application Priority Data

Dec. 31, 1993 [KR] Rep. of Korea .................. 32044/1993

[51] Int. Cl.[6] .................................................. G01J 5/08

[52] U.S. Cl. ..................... 250/353; 250/349; 250/DIG. 1

[58] Field of Search ............................. 250/338.3, 338.4, 250/349, 353, DIG. 1

[56] References Cited

U.S. PATENT DOCUMENTS

| | | | |
|---|---|---|---|
| 4,063,095 | 12/1977 | Wieder | 250/349 |
| 4,321,594 | 3/1982 | Galvin et al. . | |
| 4,523,095 | 6/1985 | Keller-Steinbach . | |
| 5,095,211 | 3/1992 | Kimata . | |
| 5,227,632 | 7/1993 | Armstrong et al. | 250/353 |

FOREIGN PATENT DOCUMENTS

| | | | |
|---|---|---|---|
| 63-1938 | 1/1988 | Japan | 250/338.3 |
| 63-139223 | 6/1988 | Japan | 250/338.3 |
| 63-293426 | 11/1988 | Japan | 250/338.3 |
| 2-171621 | 7/1990 | Japan | 250/338.3 |
| 1563283 | 6/1976 | Switzerland . | |
| 2213927 | 12/1987 | United Kingdom . | |

*Primary Examiner*—Carolyn E. Fields
*Assistant Examiner*—Edward J. Glick
*Attorney, Agent, or Firm*—Birch, Stewart, Kolasch & Birch, LLP

[57] ABSTRACT

An infrared array sensor system capable of sensing the position and orientation of a human body without using any expensive sensor elements required in conventional infrared array sensors and having functions enabling it to an air conditioner by a relatively simple construction. The infrared array sensor system includes a Fresnel lens for focusing infrared rays, a plurality of guides for guiding the infrared rays focused by the Fresnel lens in predetermined directions, a filter for filtering desired wavelength band ones of the guided infrared rays, a plurality of infrared sensor elements for sensing the filtered infrared rays, the infrared sensor elements corresponding to the directions of the infrared rays guided by the guides, respectively, and a circuit device for processing signals respectively outputted from the infrared sensor elements.

17 Claims, 15 Drawing Sheets

FIG. 18
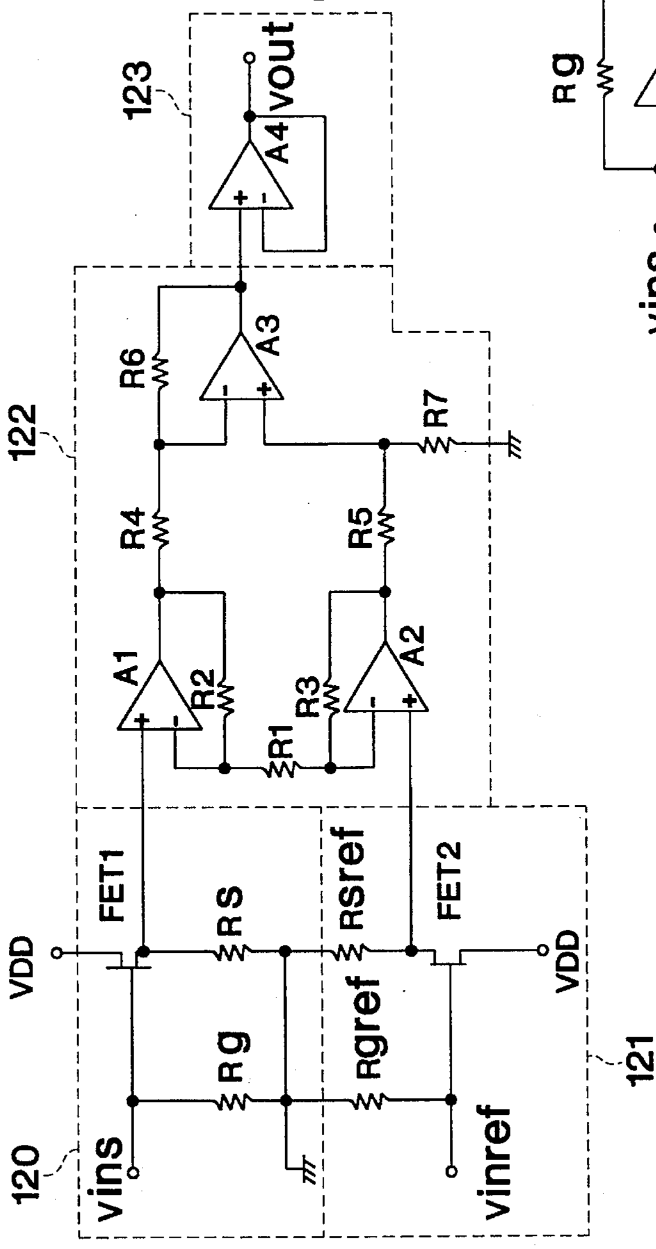
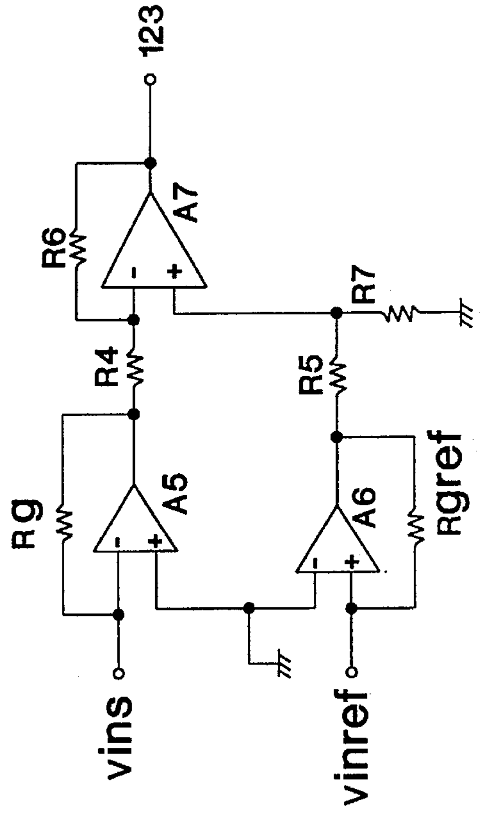
FIG. 19

INFRARED ARRAY SENSOR SYSTEM

BACKGROUND OF THE INVENTION

1. Field of the Invention

The present invention relates to an infrared array sensor system, and more particularly to an infrared array sensor system having a simple and inexpensive construction capable of sensing the position and orientation of a human body as well as the presence and motion amount of the human body.

2. Description of the Prior Art

Generally, infrared sensors are classified into those of the pyroelectric type and those of the quantum efficiency type. Infrared sensors of the pyroelectric type are used to sense a human body and a motion amount of the human body by converting infrared rays emitted from the human body into heat. On the other hand, infrared sensors of the quantum efficiency type are mainly used for military purposes or to obtain infrared images in satellites because they have a superior sensitivity over the pyroelectric type infrared sensors.

Referring to FIG. 1, there is illustrated a conventional construction of a unit infrared sensor using a ceramic element.

The unit infrared sensor includes an infrared sensing chip 1 made of one of a PLZT-based pyroelectric ceramic, a single crystal such as $LiTaO_3$ and a polyvinylidenedifluoride (PVDF) polymer. The chip 1 has an upper electrode as an infrared ray absorbing electrode and a lower electrode at its upper and lower surfaces, respectively. The chip 1 is supported by a support member 2 fixed on a stem 3 of a package, such as a TO-5 package, constituting a part of the unit infrared sensor. Formed on a predetermined portion of the support member 2 are a gate resistor Rg and a field effect transistor FET electrically connected to each other. The upper and lower electrodes of the chip 1 are connected to the gate resistor Rg and the field effect transistor FET by metal lines (not shown) extending in the support member 2.

Leads 4 extend through holes formed in the stem 3, respectively. The leads 4 are electrically connected to the field effect transistor (FET) and the gate resistor Rg, respectively. A metal housing 5 of the package is coupled to the stem 3 along the outer edge of the stem 3 so that the chip 1 is sealed from the outside of the package. A filter 6 adapted to transmit infrared rays of a band to be sensed is supported by the metal housing 5. The filter 6 is disposed at a position corresponding to the upper electrode of the chip 1.

Referring to FIG. 2, there is illustrated an equivalent circuit of the conventional unit infrared sensor having the above-mentioned construction. As shown in FIG. 2, the upper electrode of the chip 1 is connected to the gate of the FET receiving a voltage from a battery at its drain D. The lower electrode of the chip 1 is connected to a ground terminal G. The gate resistor Rg is connected between the gate of the transistor FET and the ground terminal G. On the other hand, a source resistor Rs is connected between the source S of the FET and the ground terminal G. A voltage Vs is generated across the source resistor Rs.

As a conventional infrared sensor mainly used in practical cases, an infrared sensor of the dual type is known. As shown in FIG. 3, the dual type infrared sensor includes a pyroelectric conductor having an upper electrode 8 divided into two electrodes to which leads 9 are electrically connected, respectively. Except for this construction, the dual type infrared sensor has the same construction as that of the unit infrared sensor of FIG. 1. That is, the dual type infrared sensor has the construction wherein a lower electrode 10 of the pyroelectric conductor is fixedly mounted to a support member 12 for the pyroelectric conductor by means of insulating adhesive 11.

Referring to FIG. 4, there is illustrated an equivalent circuit of the dual type infrared sensor having the above-mentioned construction. As shown in FIG. 4, the equivalent circuit of the dual type infrared sensor has a construction very similar to that of the equivalent circuit of FIG. 2 except that two pyroelectric chips having opposite polarization directions are connected in series.

Operation of the dual type infrared sensor will be described in conjunction with FIG. 7.

When the infrared sensor element 30 of the sensing unit 20 senses a motion of an object and thereby outputs an electrical signal, the field effect transistor FET converts an impedance of the electrical signal received therein and applies the resultant signal to the non-inverting terminal (+) of the amplifier A1. Since the amplifier A1 is connected to resistors R1 and R2 and capacitors C4 and C5, it serves to amplify and filter the output signal from the transistor FET. The resultant signal from the amplifier A1 is applied to the amplifier A2. Since the amplifier A2 is connected to resistors R3 and R4 and capacitors C6 and C7, it serves to amplify and filter the output signal from the amplifier A1.

Where the sensing unit 20 is subjected to an external vibration upon generating an output signal therefrom,: a vibration noise may be included in the output signal of the sensing unit 20 due to the piezo-electric characteristic of the ferroelectric element.

In the dual type infrared sensor, however, one of two infrared sensor elements is used as a reference element. This reference element is not exposed to any infrared rays. Accordingly, the vibration noise of the infrared sensor element caused by the external vibration is compensated by the reference voltage of the reference element.

Generally, noise includes thermal noise, shot noise and 1/f noise.

The thermal noise is generated due to the resistance component present in the circuit. This thermal noise can be processed by a differential amplifier circuit for amplifying a difference between the output signal of the sensor element and the output signal of the reference element.

Therefore, the dual type unit infrared sensor can detect a difference between infrared energies respectively incident on the sensor element and the reference element without responding to factors generating an erroneous operation such as vibration.

In other words, the infrared sensor can sense a variation in amount of infrared ray incident thereon because the pyroelectric element varies in temperature depending on the variation in amount of infrared rays and thereby generates a charge. Accordingly, the infrared sensor can detect an infrared ray source such as a human body moving within a field of view.

On the other hand, a pyroelectric infrared charge coupled device (IR-CCD) is shown in FIG. 5. As shown in FIG. 5, the pyroelectric IR-CCD includes a pyroelectric element 13 made of a single crystal such as $LiTaO_3$ and provided with upper and lower electrodes 14 and 15. The lower electrode 15 is electrically connected to a gate electrode of the IR-CCD formed on a silicon substrate 16 by an indium bump.

Referring to FIG. 6, there is illustrated a pyroelectric infrared array sensor using such a pyroelectric IR-CCD. As shown in FIG. 6, the pyroelectric infrared array sensor includes a sensing unit 20 for convening an impedance upon sensing a motion of an object by its sensor element, a differential amplifier unit 21 for amplifying a difference between sensed data from the sensing unit 20 and a reference voltage of the reference element of the sensing unit 20, a sample/hold unit 22 for sampling/holding an output from the differential amplifier unit 21, an analog/digital converter unit 23 for converting an output signal from the sample/hold unit 22 into a digital signal, a microcomputer 24 for receiving an output from the analog/digital converter unit 23 and analyzing an infrared image signal on the basis of the received signal, and a control unit 25 for controlling the units of the pyroelectric infrared array sensor.

As infrared rays emitted from an object are projected onto infrared array elements of the sensing unit 20 via expensive lenses made of Ge or ZnSe, the infrared array applies pyroelectric current to the IR-CCD which, in turn, outputs an electrical signal.

Accordingly, an infrared image can be analyzed for motion of the object by the circuits connected to the downstream-side of the IR-CCD.

Although the overall system of the conventional unit infrared sensor has a simple and inexpensive construction capable of sensing a human body and an amount of motion of the human body, it can not sense the orientation of the human body.

On the other hand, the conventional infrared array sensor can also sense all information such as the orientation and position of the human body. However, this sensor has a problem that it is unsuitable to be applied to products such as an air conditioner because it is very expensive due to requirements of expensive lenses and complex signal processing procedures.

SUMMARY OF THE INVENTION

Therefore, an object of the invention is to provide an infrared array sensor system capable of sensing the position and orientation of a human body without using any expensive sensor elements required in conventional infrared array sensors and having functions enabling it to be applied in an air conditioner by a relatively simple construction.

In accordance with the present invention, this object can be accomplished by providing an infrared array sensor system comprising: a Fresnel lens for focusing infrared rays; a plurality of guides for guiding the infrared rays focused by the Fresnel lens in predetermined directions; a filter for filtering desired wavelength bands of the guided infrared rays; a plurality of infrared sensor elements for sensing the filtered infrared rays, the infrared sensor elements corresponding to the directions of the infrared rays guided by the guides, respectively; and circuit means for processing signals respectively outputted from the infrared sensor elements.

BRIEF DESCRIPTION OF THE DRAWINGS

Other objects and aspects of the invention will become apparent from the following description of embodiments with reference to the accompanying drawings in which:

FIG. 18 is a circuit diagram illustrating a detailed construction of the circuit shown in FIG. 9;

FIG. 19 is a circuit diagram illustrating a differential amplifier unit having a different construction from that of FIG. 18.

DETAILED DESCRIPTION OF THE PREFERRED EMBODIMENTS

Figure 1:
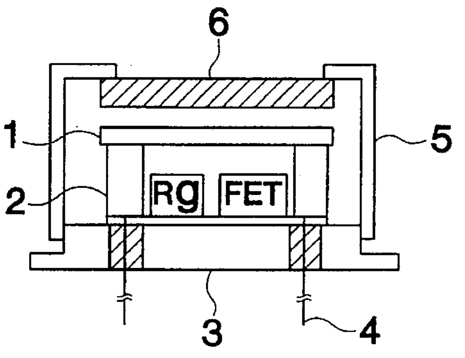
FIG. 1 CONVENTIONAL ART
FIG. 1 is a sectional view illustrating an infrared sensor employing a conventional infrared sensor element.
Figure 2:
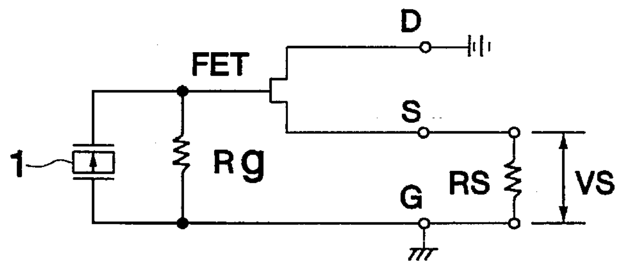
FIG. 2 CONVENTIONAL ART
FIG. 2 is a circuit diagram of an equivalent circuit of the infrared sensor shown in FIG. 1.
Figure 3:
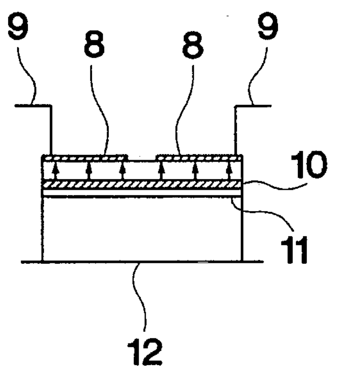
FIG. 3 CONVENTIONAL ART
FIG. 3 is a sectional view illustrating a conventional dual type infrared sensor element.
Figure 4:
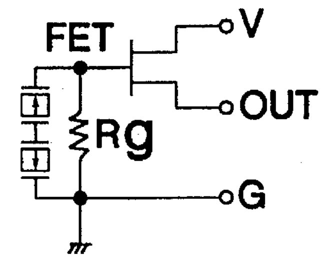
FIG. 4 CONVENTIONAL ART
FIG. 4 is a circuit diagram of an equivalent circuit of an infrared sensor employing the dual type infrared sensor element shown in FIG. 3.
Figure 5:
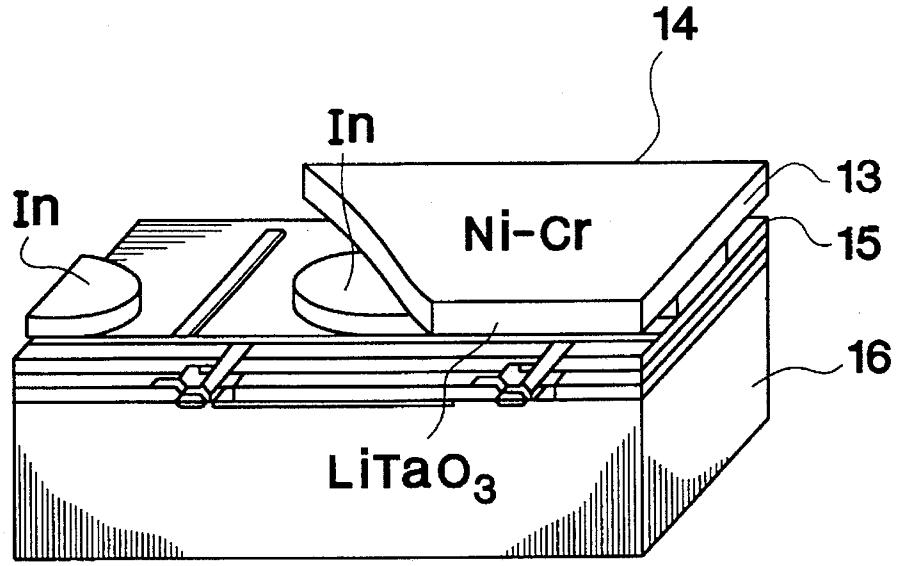
FIG. 5 CONVENTIONAL ART
FIG. 5 is a sectional view of a conventional infrared array sensor employing an indium bump.
Figure 6:
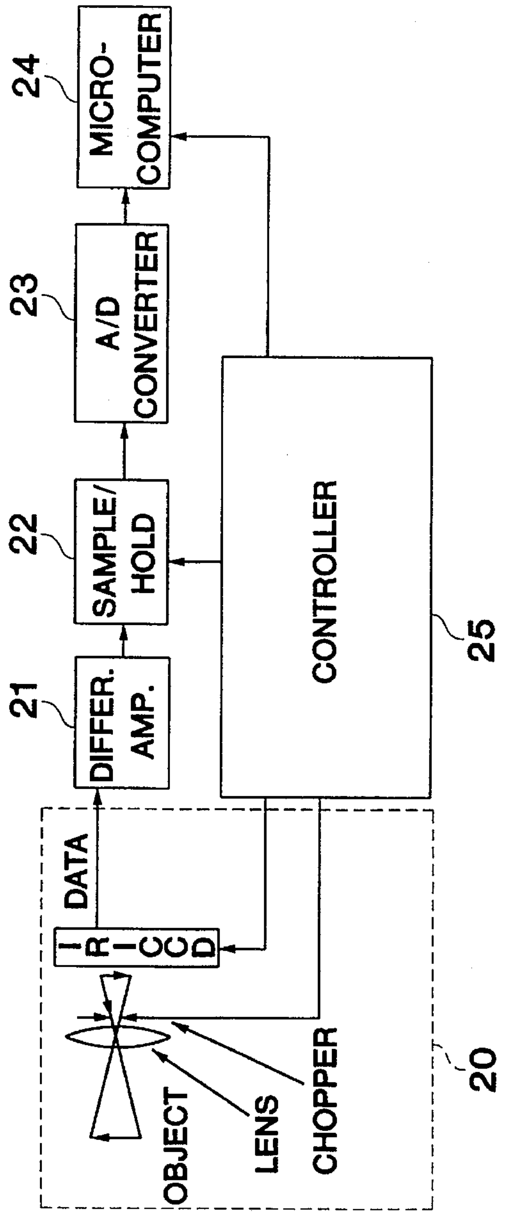
FIG. 6 CONVENTIONAL ART
FIG. 6 is a block diagram of a signal processing system for a conventional IR-CCD.
Figure 7:
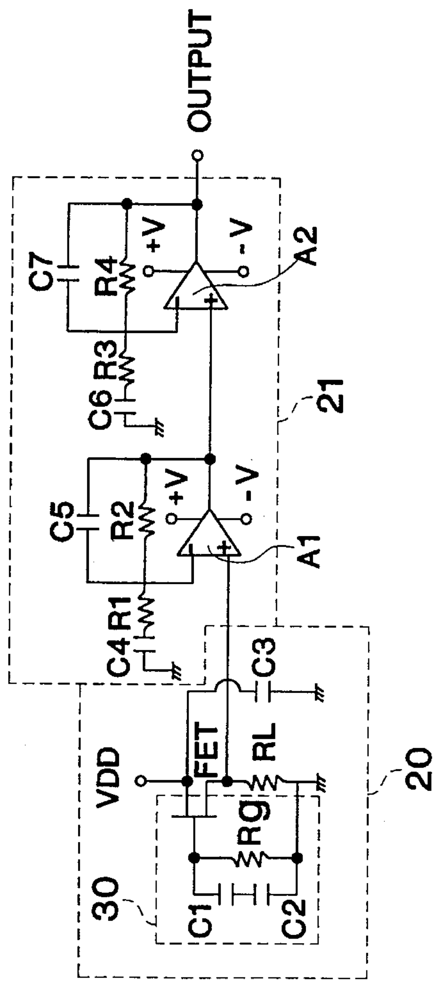
FIG. 7 CONVENTIONAL ART
FIG. 7 is a circuit diagram of a differential amplifier unit employed with the infrared sensor shown in FIG. 3.
Figure 8:
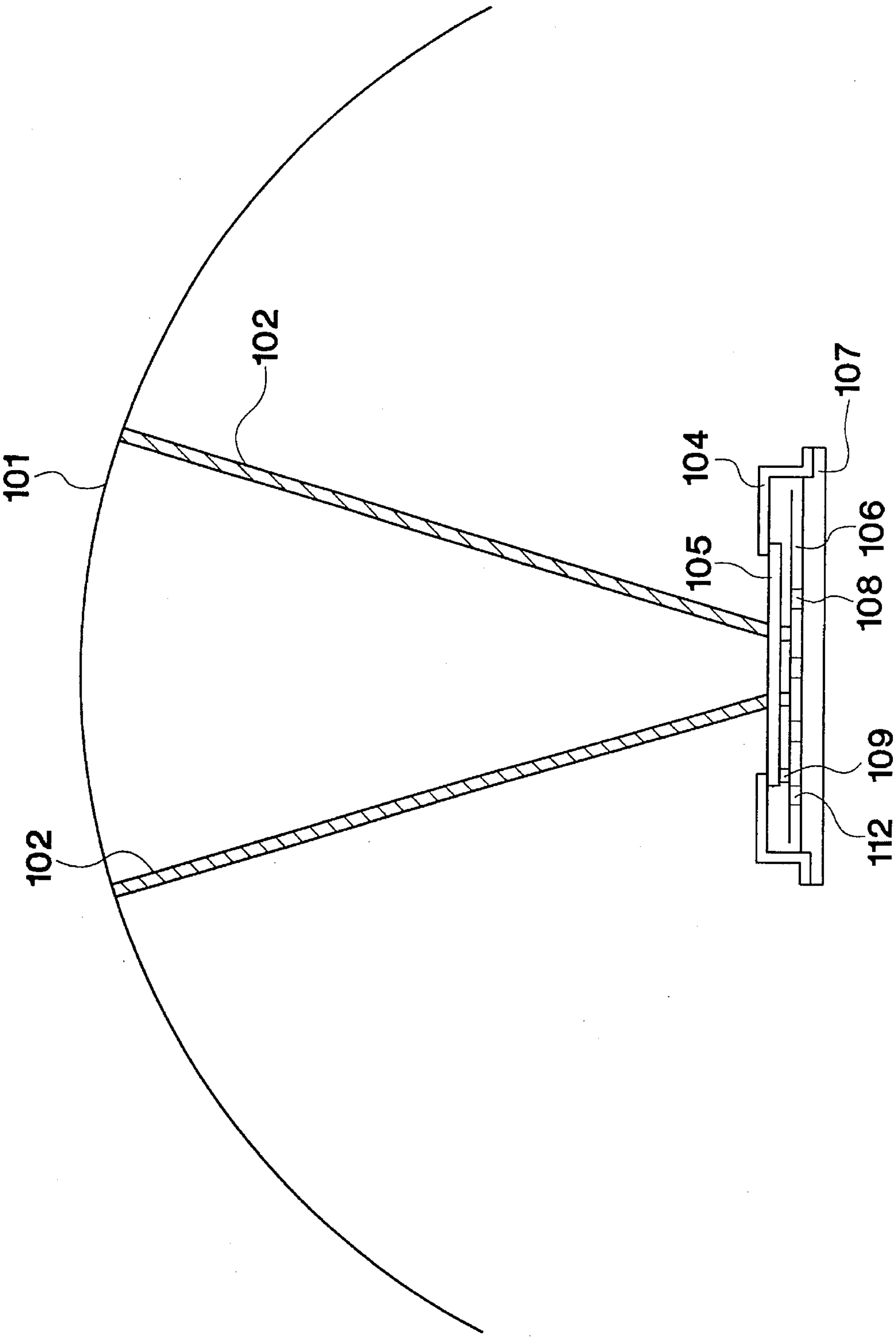
FIG. 8 is a sectional view schematically illustrating an infrared array sensor system in accordance with the present invention.
Figure 9:
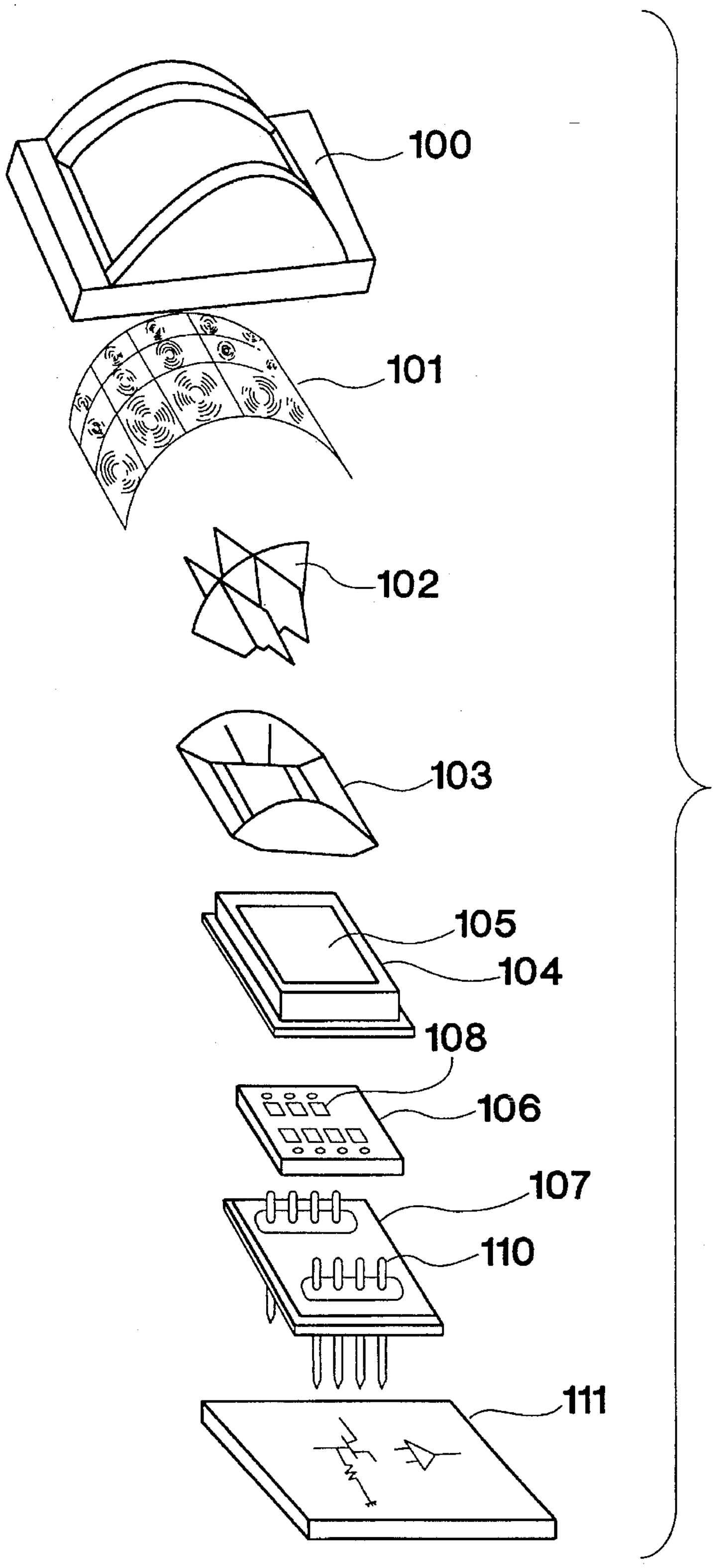
FIG. 9 is an exploded perspective view of the infrared array sensor system shown in FIG. 8.

FIGS. 8 and 9 illustrate an infrared array sensor system in accordance with the present invention, respectively.

As shown in FIGS. 8 and 9, the infrared array sensor system includes a composite Fresnel lens 101 fixedly mounted to a lens fixing and covering member 100, a plurality of guides 102 fixedly mounted to a guide fixing member 103 and adapted to guide infrared rays focused by the Fresnel lens 101 in desired directions, respectively, and an infrared filter 105 fixedly mounted to a filter mounting cover 104 and adapted to filter desired wavelength bands among the guided infrared rays. The infrared array sensor system also includes a plurality of infrared sensors 108 respectively adapted to sense the infrared rays guided in the desired directions by the guides 102 and incident thereon via the filter 105. The infrared sensors 108 are formed on a drive circuit board 106. The infrared array sensor system further includes a plurality of spacers 109 each adapted to prevent infrared rays of all the directions except for each corresponding direction from being incident on each corresponding one of the infrared sensors 108.

The drive circuit board 106 is fixedly mounted to a step 107 of a package. The mounting of the drive circuit board 106 to the step 107 is achieved by inserting leads 110 of the step 107 into through-holes of the drive circuit board 106, respectively. The leads of the step 107 are connected to electrode pads of a circuit device 111 of a printed circuit board (PCB), respectively.

Figure 15A:
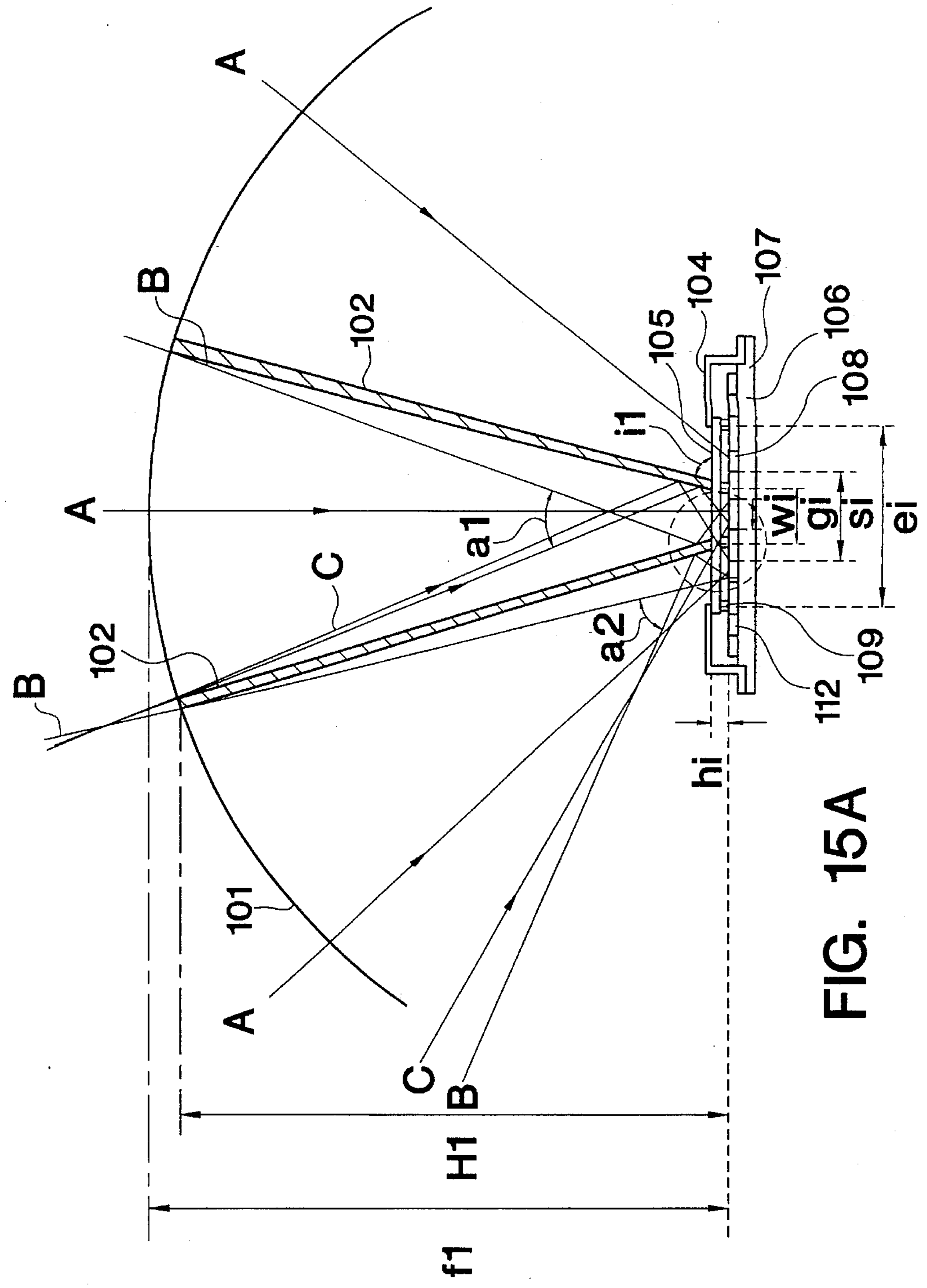
FIGS. 15A and 15B are schematic views respectively explaining vertical and horizontal sensing angles, respectively, of the infrared array sensor system in accordance with the present invention.

The circuit device 111 serves to differentially amplify a sensing signal outputted from each of the infrared sensors 108 and a signal outputted from a reference element. The reference element denoted by the reference numeral 112 in FIG. 15A is formed on the drive circuit board 106 at a position on which no infrared ray is incident. The reference element provides a reference signal for the differential amplification and serves to prevent an erroneous operation of the infrared sensors.

Each of the infrared sensors 108 is made of a single crystal pyroelectric conductor such as $LiTaO_3$ or $LiNbO_3$, a PLZT-based ceramic or a pyroelectric thin film. Where each of the infrared sensors 108 is made of the single crystal pyroelectric conductor of $LiTaO_3$ or the pyroelectric ceramic, it has an upper electrode 128 and a lower electrode 138 at its upper and lower surfaces, respectively, as shown in FIG. 10.

Figure 11:
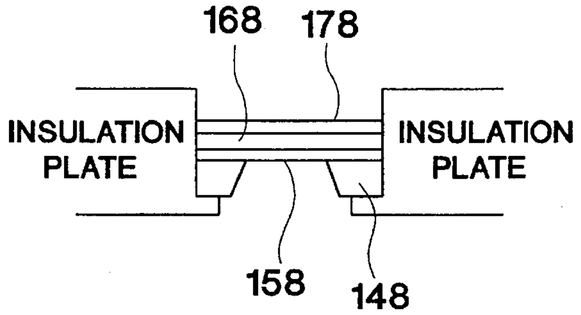
FIG. 11 is a sectional view illustrating another example of the infrared sensor shown in FIG. 8.

In the case of using a pyroelectric thin film, each of the infrared sensors 108 has an MgO substrate 148 having an anisotropically etched lower portion, a lower electrode 158 formed on the MgO substrate 148, a pyroelectric film 168 formed over the lower electrode 158 and an upper electrode 178 formed over the pyroelectric film 168, as shown in FIG. 11.

Figure 10:
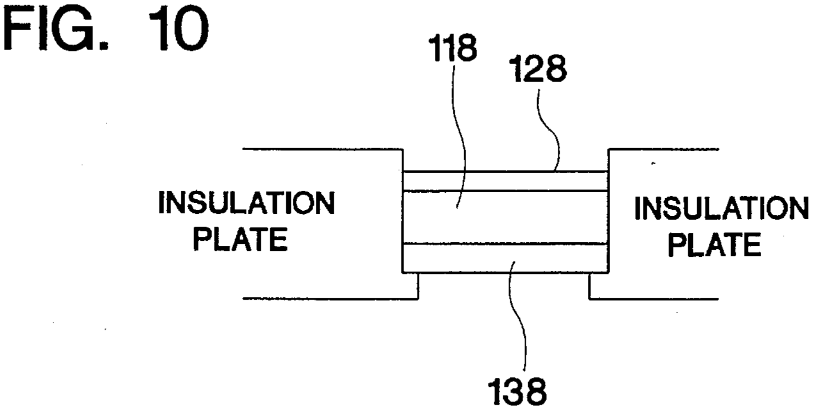
FIG. 10 is a sectional view illustrating an example of an infrared sensor shown in FIG. 8.

In the case shown in FIG. 10, the upper and lower electrodes 128 and 138 of each infrared sensor are formed using a thermal evaporation method, an electron-beam evaporation method or a sputtering method.

In this case, the lower electrode 138 has the same thickness as in general cases. However, the upper electrode 128 is formed by forming a thin metal layer exhibiting a relatively superior infrared ray absorbance, forming a porous metal layer, or forming an infrared ray absorbing layer over a general metal layer so that it exhibits an infrared ray absorbing function.

In the case shown in FIG. 11, the lower electrode 158 formed on the MgO substrate 148 is made of Pt. In this case, the pyroelectric film 168 is epitaxially grown over the pyroelectric film !68. On the other hand, the upper electrode 178 is formed using the thermal evaporation method, the electron-beam evaporation method or the sputtering method.

Figure 12:
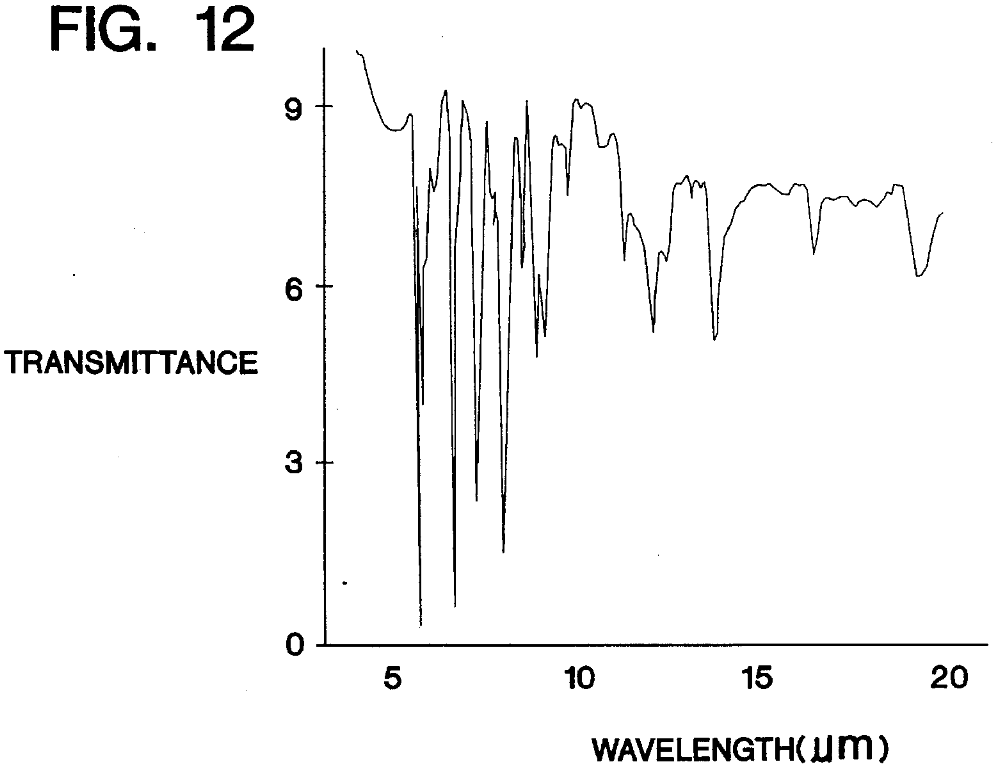
FIG. 12 is a graph illustrating the infrared ray transmittance of a polyimide employed in the case of FIG. 11.

In order to obtain an increased sensitivity, the lower surface of the MgO substrate 148 is anisotropically etched. However, the infrared sensor of such a capacitor type may be easily damaged. In order to prevent such a damage, a polyimide layer exhibiting a superior infrared ray transmittance and a function of supporting the infrared sensor may be formed over the upper electrode 178. In FIG. 12, the infrared ray transmittance of the polyimide layer is illustrated.

Figure 13:
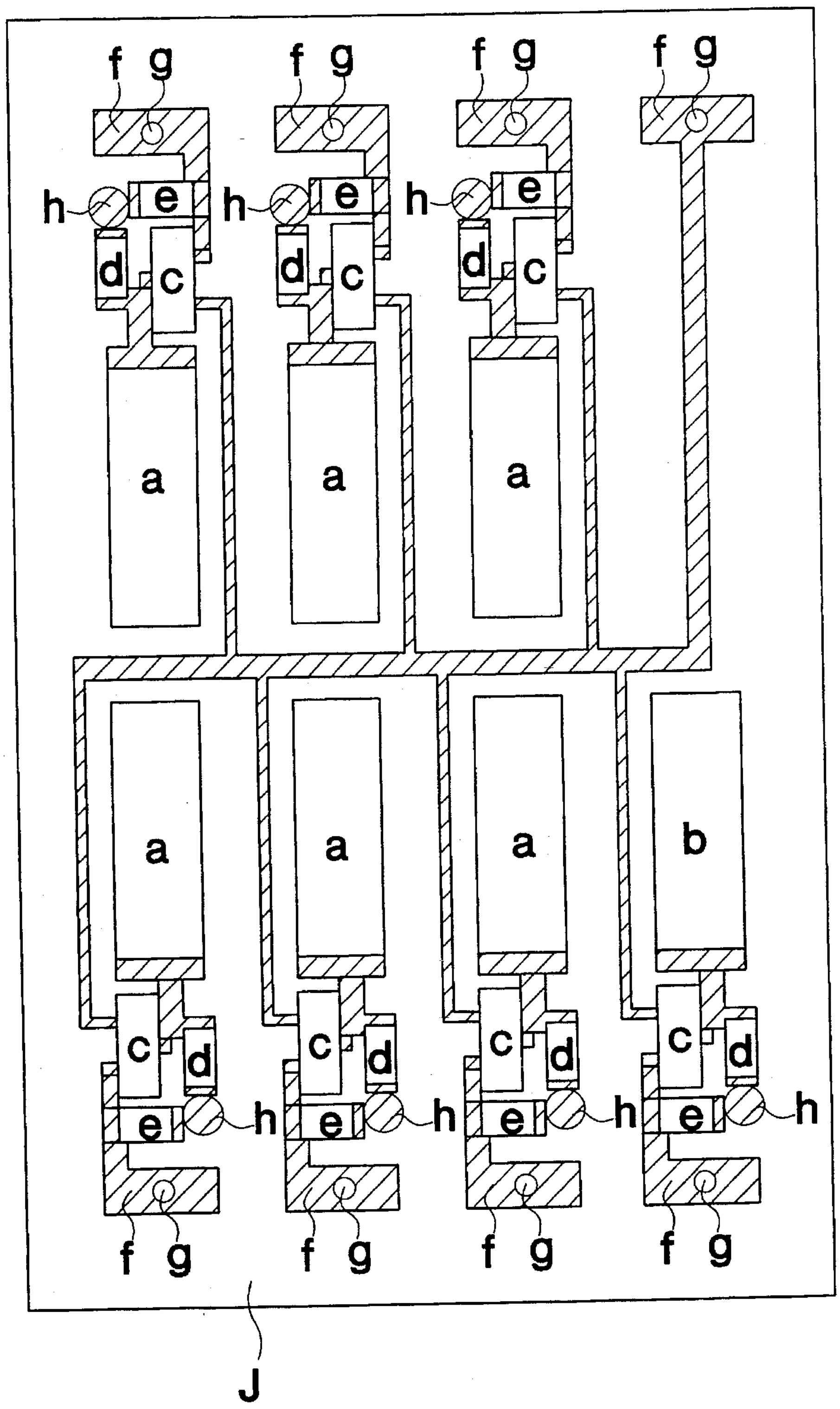
FIG. 13 is a schematic plan view of the infrared array sensor system in accordance with the present invention.

Meanwhile, elements of the infrared array sensor system of the present invention are disposed on the upper surface of an insulation plate J, as shown in FIG. 13.

That is, the infrared sensors 108, each adapted to sense infrared rays in a different direction, are disposed at regions a on the insulation plate J, respectively. The infrared sensor 112 as the reference element is disposed at a region b on the insulation plate J corresponding to a region of the package on which no infrared ray is incident. At regions C of the insulation plate J, field effect transistors FETs are disposed, respectively. Gate electrodes are disposed at regions d of the insulation plate J, respectively. Source resistors are disposed at regions e of the insulation plate J, respectively. At regions f of the insulation plate J, electrode pads are disposed, respectively. The leads 110 of the package are inserted into through-hole regions g of the insulation plate J, respectively.

The insulation plate j also has regions h at which ground terminals connecting the lower surface of the insulation plate J and the stem 107 of the package shown in FIG. 9 are disposed, respectively. The insulation plate J also has regions i respectively corresponding to power supply lines connected to drains of the field effect transistors FETs. In FIG. 13, the shade regions correspond to metal paste electrodes, respectively.

Figure 14:
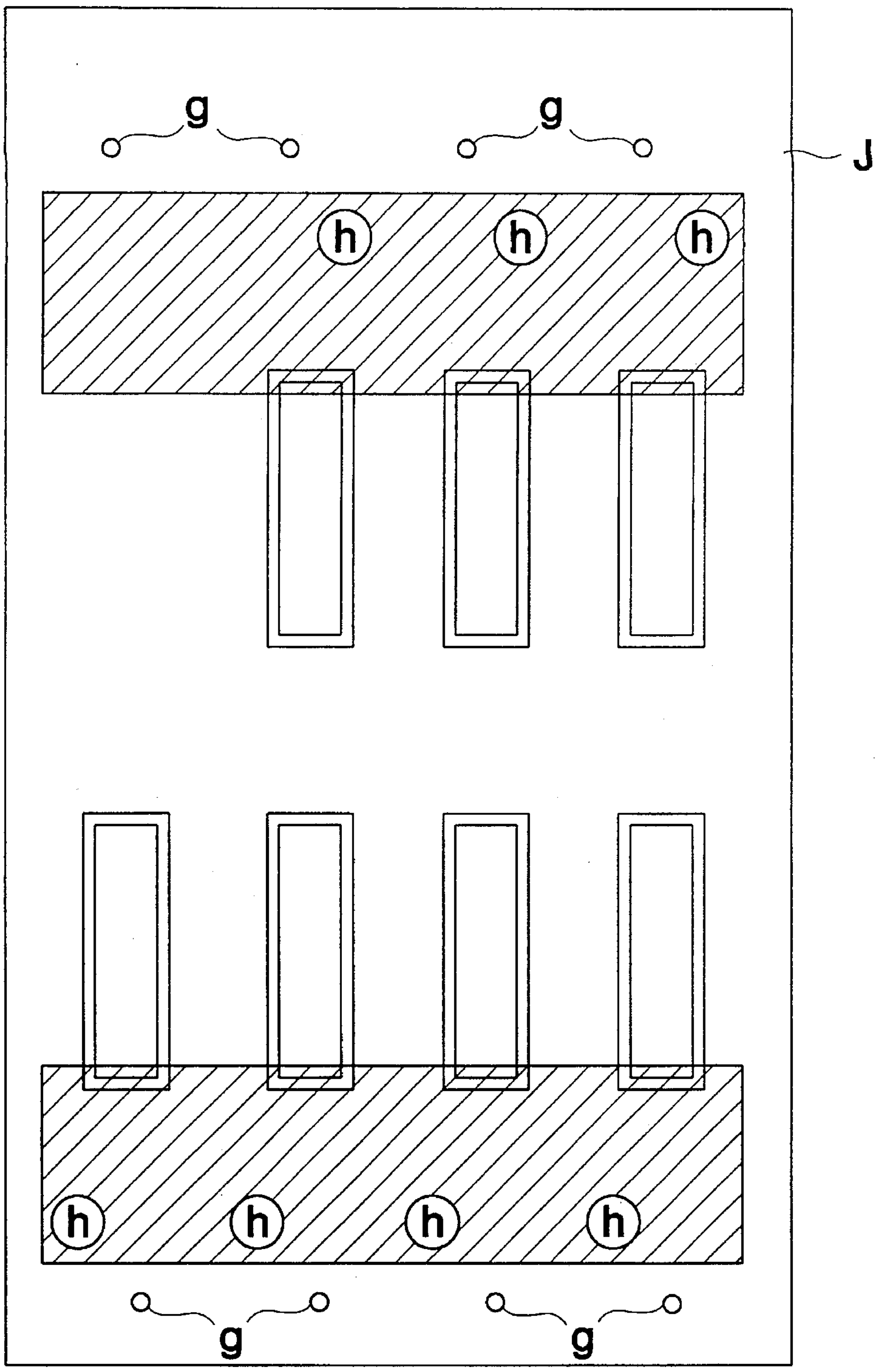
FIG. 14 is a schematic bottom view of the infrared array sensor system in accordance with the present invention.

In the case of FIG. 13, elements of the infrared array sensor system are disposed on the lower surface of the insulation plate J, as shown in FIG. 14.

In FIG. 14, the shade regions correspond to metal paste electrodes, respectively. The metal paste electrodes are electrically connected to the upper surface of the package step 107. The regions h of the insulation plate J correspond to the ground terminals extending through the insulation plate J and connecting the upper surface of the insulation plate J and the package step 107, respectively. The leads 110 of the package shown in FIG. 9 are inserted into through-hole regions g of the insulation plate J, respectively.

Now, formation of the above-mentioned construction will be described. First, metal paste electrodes are formed on predetermined regions on upper and lower surfaces of the substrate, respectively. Thereafter, chip resistors, chip field effect transistors FETs and elements of infrared sensors are mounted in corresponding holes of the substrate, respectively, so as to electrically connect required elements with one another. Subsequently, the leads of the package shown in FIG. 10 are inserted into the through-holes of the circuit board 106 and then fixed to the circuit board.

Operation of the infrared array sensor system in accordance with the present invention will be described.

As shown in FIG. 9, infrared rays emitted from a human body are focused by the Fresnel lens 101 toward the drive circuit board 106. The infrared rays are divided by the guides 102 into those of directions respectively corresponding to the infrared sensors 108 and are then focused onto the corresponding infrared sensors 108, respectively.

As shown in FIG. 13, the drive circuit board 106 is a circuit board on which elements of the system are:arranged. The leads 110 are inserted into the regions g of FIG. 13, respectively. The filter cover 104 serves to seal the drive circuit board 106 mounted on the step 107. On the upper surface of the filter mounting cover 104, the infrared filter 105 adapted to transmit infrared rays having the wavelength of 7 to 13 μm is mounted.

A sensing angle of the infrared array sensor system in accordance with the present invention will be described :in detail, in conjunction with FIGS. 15A and 15B.

As shown in FIG. 15A, infrared sensors 108 partitioned by adjacent two guides 102 serve to sense infrared rays distributed at three different horizontal regions, that is, a left region, a middle region and a fight region. The infrared sensor 112 shielded by the filter mounting cover 104 is the reference element for preventing an erroneous operation caused by factors other than the incidence of infrared rays. In FIG. 15A, the reference characters "A" are indicative of the incidence of infrared rays on each corresponding one of the infrared sensors 108 via the Fresnel lens 101. The reference characters "B" are indicative of the maximum incident angle of infrared rays on the middle infrared sensor 108 at the middle region. On the other hand, the reference character C is indicative of the incidence of infrared rays on infrared sensor 108 neighboring to the infrared sensor corresponding to the region on which the infrared rays are incident.

The sensing angle a1 at the middle region is determined by H1, f1, i1, h1, w1 and g1 respectively indicated in FIG. 15A. The sensing angle a2 at the left region is determined by the view angle of the Fresnel lens 101 and H1, f1, i1, h1, g1, s1 and l1 respectively indicated in FIG. 15A. Here, "H1" represents the height of the upper end of each guide, "f1" the focus length of the Fresnel lens, "i1" the mounted angle of each guide, "h1" the height of the lower end of each guide, "w1" the width of each infrared sensor, "g1" the space between adjacent guides, "l1" the width of each window, "s1" the value of 2 g1−w1.

Infrared rays inclinedly incident on each corresponding infrared sensor 108 with a focus length longer than the focus length f1 may generate an erroneous operation of the infrared sensor. In place Of using the spacers 109, this erroneous operation may be prevented using a method of neglecting output signals of the infrared sensor 108 lower than the threshold value.

Figure 15B:
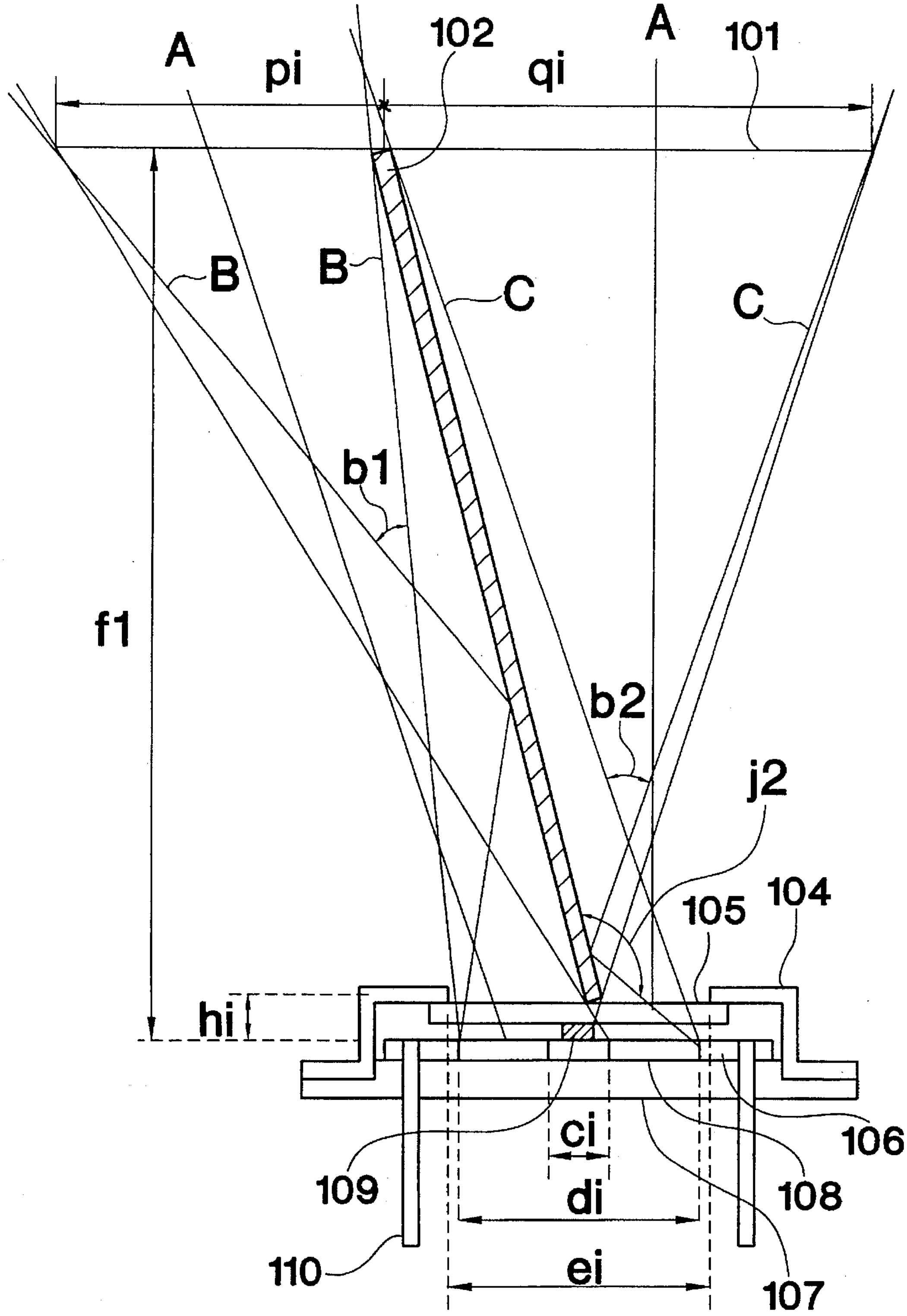

As shown in FIG. 15B, infrared sensors 108 partitioned by each guide 102 serve to sense infrared rays distributed at two vertical regions, that is, an upper region and a lower region. The upper anal lower regions divided by each guide 102 correspond to far and near regions to be sensed, respectively. In FIG. 15B, the reference numeral 110 denotes the leads shown in FIG. 9. The Fresnel lens 101 is shown in the form of a cylindrical vertical surface. Actually, the guide 102 has a sector shape.

Figure 16A:
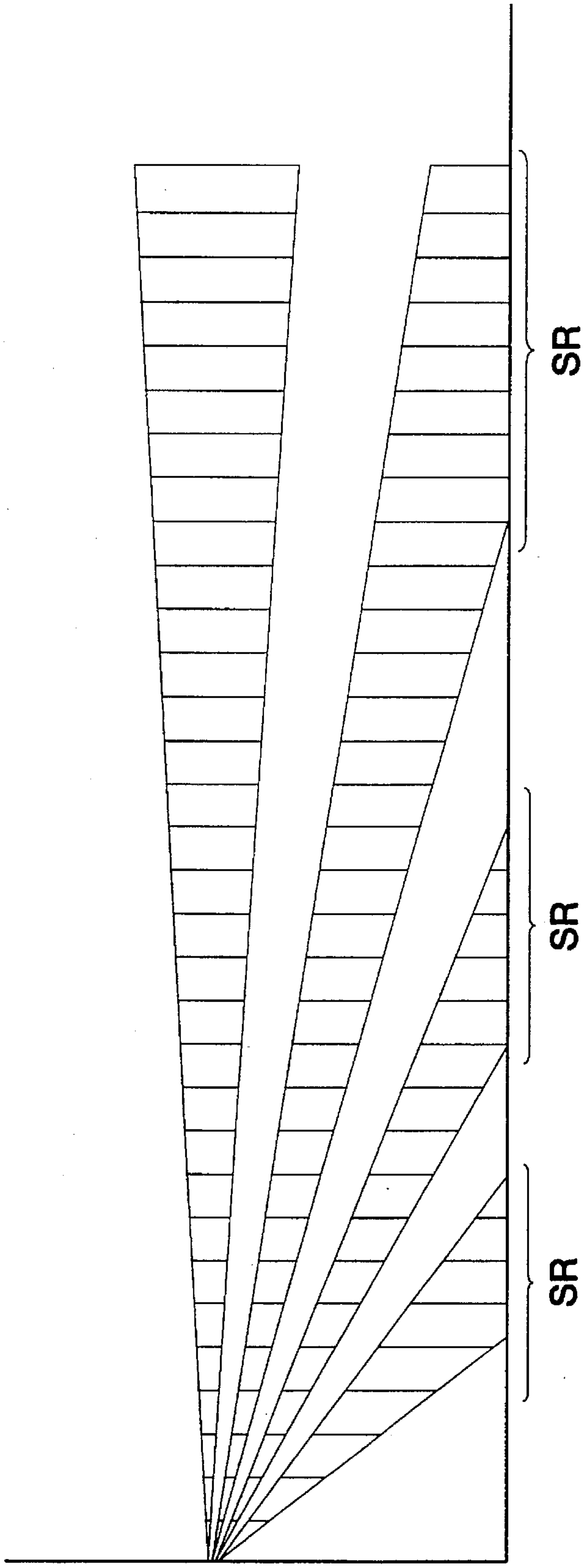
FIGS. 16A and 16B are schematic views respectively illustrating vertically and horizontally divided sensing regions, respectively, of the infrared array sensor system in accordance with the present invention.

The sensing angle b1 at the upper region is determined by f1, j1, q1, c1, d1 and h1 respectively indicated in FIG. 15B. The sensing angle b2 at the lower region is determined by f1, j1, p1, c1, d1 and h1 respectively indicated in FIG. 15B. Here, "f1" represents the focus length of the Fresnel lens, "j1" the mounted angle of each guide, "h1" the height of the lower end of each guide, "c1" the space between adjacent infrared sensors, "d1" the sum of twice the width of each infrared sensor and c1, "e1" the width of each window, "p1" the lateral width of each lower element of the Fresnel lens, and "q1" the lateral width of each upper element of the Fresnel lens.

Where the infrared array sensor system is mounted to a wall at a predetermined level, upper and lower sensing regions SR are divided by a dotted line, as shown in FIG. 16A. The dotted line corresponds to the position of each guide 102, dividing vertically adjacent sensing regions, on each infrared array sensor. Sensing regions respectively positioned above and beneath the dotted line correspond to far and near sensing regions sensed by each corresponding infrared sensor of the infrared sensor array.

Figure 16B:
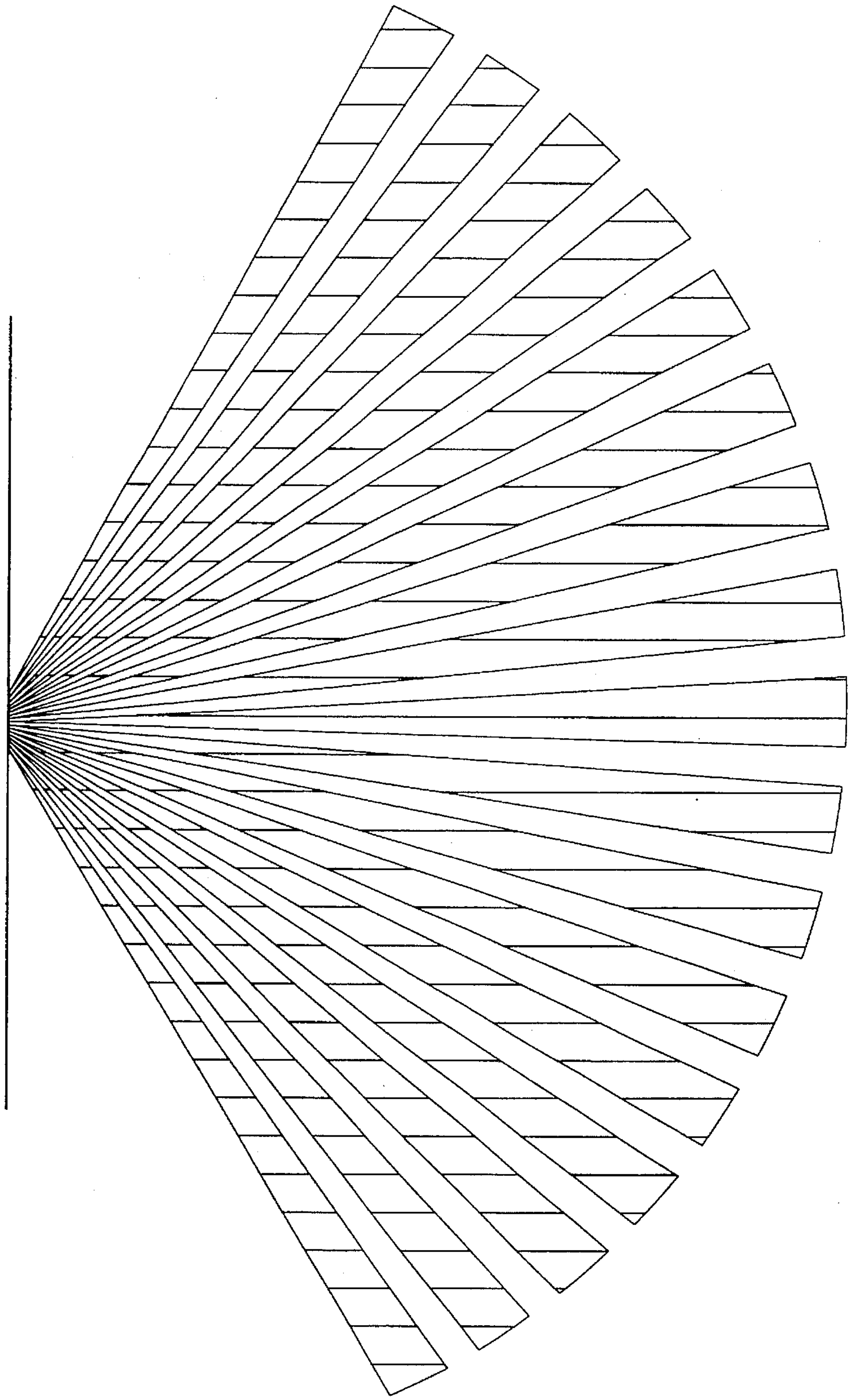

Left, middle and right sensing regions are divided by dotted lines, as shown in FIG. 16B. The dotted lines correspond to positions of two guides 102, dividing horizontally adjacent sensing regions, on each corresponding infrared sensor.

The sensing angle in each direction is determined by the focus length and size of the Fresnel lens 101 and the size of each infrared sensor 108. The incidence direction is determined by the geometrical arrangement of the infrared sensors and lens sections.

As shown in FIGS. 15A and 15B, a region to be sensed are divided into six regions including upper and lower regions each classified into left, middle and right regions.

FIG. 16B shows the ease wherein 6 Fresnel lens elements, 5 Fresnel lens elements and 6 Fresnel lens elements are arranged at left, middle and right sensing regions to cover the left sensing angle of 40°, the middle sensing angle of 30° and the right sensing angle of 40°, respectively. On the other hand, FIG. 16A shows the case wherein two Fresnel lens elements are arranged at each of the upper and lower sensing regions to cover the vertical incidence direction.

Figure 17:
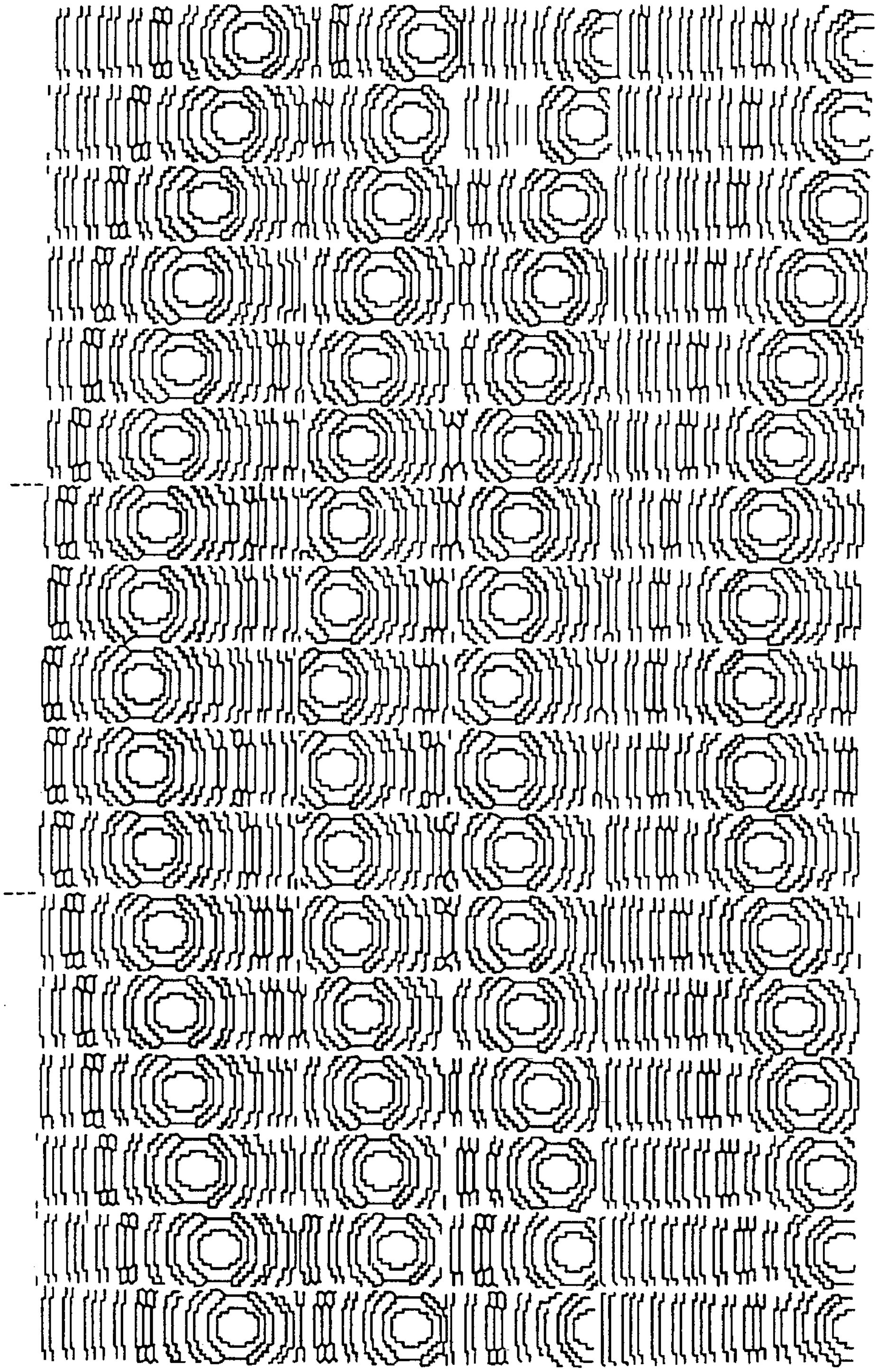
FIG. 17 is a plan view illustrating a composite Fresnel lens in accordance with the present invention.

FIG. 17 shows an example of the design of the composite Fresnel lens associated with the arrangements of infrared sensors and guides described in conjunction with FIG. 13.

The center position, width and height of each lens section are determined by the setting of sensing regions and the arrangement of infrared sensors.

Four horizontal lens section lines are vertically arranged in accordance with the setting of sensing regions shown in FIGS. 16A and 16B. Each horizontal lens section lines includes 6 lens sections, 5 lens sections and 6 lens sections at left, middle and right regions, respectively.

Referring to FIG. 18, the circuit device 111 of the infrared array sensor system includes a first sensing unit 120 for impedance-converting a sensor voltage Vins outputted from each infrared sensor 108 and a second sensing unit 121 for impedance-converting a reference voltage Vinref from the reference element 112. The circuit device 111 also includes a differential amplifier unit 122 for receiving output voltages from the first and second sensing units 120 and 121 and differentially amplifying the received voltages, and a buffer unit 123 for buffering an output from the differential amplifier unit 122.

The first sensing unit 120 includes a field effect transistor FET1 having a gate coupled to the ground via a gate resistor Rg and applied with the sensor voltage Vins, a drain applied with a source voltage VDD and a source coupled to the ground via a source resistor Rs.

The second sensing unit 121 includes a field effect transistor FET2 having a gate coupled to the ground via a gate resistor Rgref and applied with the reference voltage Vinref, a drain applied with the source voltage VDD and a source coupled to the ground via a source resistor Rsref.

On the other hand, the differential amplifier unit 122 includes a first amplifier A1 coupled at its non-inverting input terminal (+) to the field effect transistor FET1 and at its inverting input terminal (−) to its output terminal via a resistor R2, a second amplifier A2 coupled at its non-inverting input terminal (+) to the field effect transistor FET2 and at its inverting input terminal (−) to its output terminal via a resistor R3, a resistor R1 coupled between the inverting input terminals (−) of the amplifiers A 1 and A2, and a third amplifier A3 coupled at its inverting input terminal (−) to the output terminal of the first amplifier A1 via a resistor R4 and to its output terminal via a resistor R6 and at its non-inverting input terminal (+) to the output terminal of the second amplifier A2 via a resistor R5 and to the ground via a resistor R7.

The buffer unit 123 includes an amplifier A4 coupled at its non-inverting input terminal (+) to the output terminal of the third amplifier A3 and at its inverting input terminal (–) to its output terminal.

In the circuit device 111 having the above-mentioned construction, the first sensing unit 120 receives the sensor voltage Vins outputted from the infrared sensor 108. The output impedance of the first sensing unit 120 is converted by the gate resistor Rg and the field effect transistor FET1. On the other hand, the second sensing unit 121 receives the reference voltage Vref. The output impedance of the second sensing unit 121 is converted by the gate resistor Rgref and the field effect transistor FET2.

The differential amplifier unit 122 amplifies differentially output signals from the first and second sensing units 120 and 121 by its amplifiers A1, A2 and A3.

Assuming that the resistors R2 and R3 have the same resistance, the resistors R4 and R5 have the same resistance and the resistors R6 and R7 have the same resistance, the amplifying rate of the differential amplifier unit 122 corresponds to the value of (1 +2R2/R3)×R5/R4.

The buffer unit 123 carries out a buffering function for stably supplying an output from the differential amplifier unit 122 without carrying out any amplifying function.

As a result, an output from each infrared sensor caused by erroneous operation factors such as vibration of the package of the infrared sensor and an abrupt variation in surrounding temperature is offset by the output of the reference element. Accordingly, it is possible to obtain signals caused only by the incident infrared rays.

Motion of a human body causes generation of an output signal from one or more of the infrared sensors corresponding to the orientation of the motion. A variation of the output signal is indicative of the fact that the human body as the infrared ray source is moving. Accordingly, the motion amount of the human body can be detected by counting the number of pulses of the signal outputted from the infrared sensors.

That is, as the number of pulses outputted from the buffer units 123 are counted by a counter which is connected to each buffer unit 123 it is possible to detect the motion amount of the human body using the variation in the number of counted pulses.

In place of the construction shown in FIG. 18, the circuit device 111 may have a construction including a current mode differential amplifier unit, as shown in FIG. 19.

As shown in FIG. 19, the current mode differential amplifier unit includes an amplifier A5 having an inverting input terminal (–) coupled to its output terminal via a gate resistor Rg and applied with the sensor voltage Vins, an amplifier A6 having a non-inverting input terminal (+), coupled to its output terminal via a gate resistor Rgref and applied with the reference voltage Vinref and an inverting input terminal (–) coupled along with the non-inverting input terminal (+) of the amplifier A5 to the ground, and an amplifier A7 having a non-inverting input terminal (+) coupled to the output terminal of the amplifier A6 via a resistor R5 and to the ground via a resistor R7 and an inverting terminal (–) coupled to the Output terminal of the amplifier A5 via a resistor R4 and to its output terminal via a resistor R6.

In this case, the non-inverting input terminal (+) of the buffer unit 123 is connected to the output terminal of the amplifier A7.

The circuit device having the construction of FIG. 19 requires no impedance conversion as is required using the field effect transistors in FIG. 18. In this case, it is only necessary to differentially amplify signals outputted from the infrared elements of the infrared array system by the amplifier A7 in a parallel manner.

In this case, the amplifying rate corresponds to the value of–R6/R4 if the resistors R4 and R5 have the same resistance and the resistors R6 and R7 have the same resistance.

Figure 20:
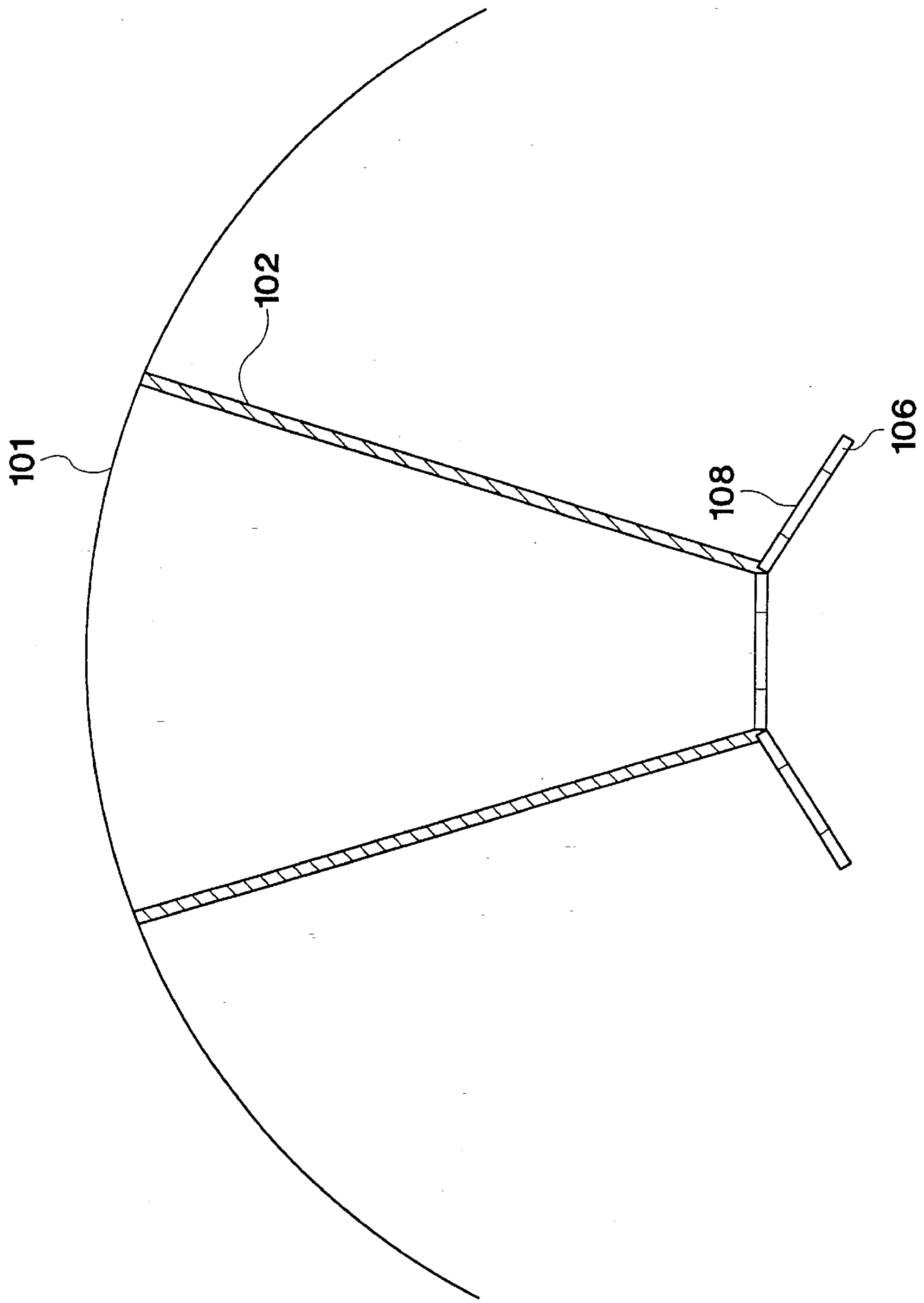
FIG. 20 is a plan view illustrating a construction different from that of FIG. 8.

Referring to FIG. 20, a plurality of circuit boards 106 respectively formed with the infrared sensors 108 may be coupled with the guides 102, in place of using the construction wherein the infrared sensors 108 are integrated in the single circuit board.

As apparent from the above description, the present invention provides an infrared array sensor system having an inexpensive construction capable of detecting whether a person is positioned at a far region or a near region, whether the person is positioned at a left region, a middle region or a right region and the motion amount of the person.

Although the preferred embodiments of the invention have been disclosed for illustrative purposes, those i skilled in the art will appreciate that various modifications, additions and substitutions are possible, without departing from the scope and spirit of the invention as disclosed in the accompanying claims.

What is claimed is:

1. An infrared array sensor system for sensing a position of an objecting a certain space comprising:

Fresnel lenses for focusing infrared rays incident thereto from a plurality of divided regions;

a plurality of guides for guiding the infrared rays focused by the Fresnel lenses in predetermined directions, each said direction corresponding to one of said divided regions;

a filter for filtering a desired wavelength band of the guided infrared rays;

a plurality of infrared sensor elements for sensing the filtered rays, the infrared sensor elements corresponding to the directions of the infrared rays guided by the guides, respectively; and circuit means for processing signals respectively outputted from the infrared sensor elements.

2. An infrared array sensor system in accordance with claim 1, wherein the infrared sensor elements are vertically divided into an upper group and a lower group, and wherein each region is divided into an upper direction and a lower direction.

3. An infrared array sensor system in accordance with claim 1, wherein the infrared sensor elements are horizontally divided into a left group, a middle group and a right group, and wherein each region is divided into a left direction, a middle direction, and a right direction.

4. An infrared array sensor system in accordance with claim 1, wherein the infrared sensor elements are arranged on a single circuit board.

5. An infrared array sensor system in accordance with claim 1, wherein the infrared sensor elements are arranged on a plurality of circuit boards, respectively.

6. An infrared array sensor system in accordance with claim 1, wherein each of the infrared sensor elements is shielded from infrared rays incident thereon in other directions than the direction corresponding to the infrared sensor element by spacers.

7. An infrared array sensor system in accordance with claim 1, wherein spacers are arranged between each of the sensing elements and between said filter and the infrared sensor elements.

8. An infrared array sensor system in accordance with claim 1, wherein the circuit means comprises:

a first sensing unit for receiving a voltage outputted from each infrared sensor element and converting an output impedance thereof on the basis of the received voltage;

a second sensing unit for receiving a voltage outputted from a reference element and converting an output impedance thereof on the basis of the received voltage;

a differential amplifier unit for differentially amplifying output signals from the first and second sensing units; and a buffer unit for buffering an output signal from the differential amplifier unit.

9. An infrared array sensor system in accordance with claim 8, wherein the differential amplifier unit amplifies currents.

10. An infrared array sensor system comprising:

a Fresnel lens for focusing infrared rays;

a plurality of guides for guiding the infrared rays focused by the Fresnel lens in predetermined directions;

a filter for filtering desired wavelengths of the guided infrared rays;

a plurality of infrared sensor elements for sensing the filtered infrared rays, the infrared sensor elements corresponding to the directions of the infrared rays guided by the guides, respectively; and circuit means for processing signals respectively outputted from the infrared sensor elements, wherein the infrared sensor elements are arranged on a single circuit board having a reference element shielded from any infrared ray incident thereon.

11. The infrared sensor system of claim 10, said circuit means including a counter which counts processed signals from the infrared sensor elements.

12. An infrared sensor system having a field of view, said sensor system for detecting movement of a living being across, as well as the amount of movement across, the field of view, said infrared sensor system comprising:

an array of Fresnel lenses for focusing infrared rays emitted by said living being to multiple images;

a filter for transmitting only a desired infrared wavelength band of the radiation emitted by said living being;

a plurality of infrared sensor elements for sensing the infrared rays transmitted by said filter;

means for preventing infrared rays from a given portion of the field of view of said sensor system from being incident on more than a single infrared sensor element;

circuit means four removing noise components, amplifying, and providing corresponding output signals to signals respectively outputted from the infrared sensor elements; and a counter having as its input the output signals of the circuit means to thereby provide an indication of the amount of motion of the living being across said field of view.

13. The infrared sensor system of claim 12, said means for preventing including a plurality of guides located between said Fresnel lens array and said plurality of sensor elements so as to partition the field of view among the sensor elements.

14. The infrared sensor system of claim 13, said plurality of sensor elements being an array of sensor elements and said means for preventing including spacers located between the filter and said array of sensors elements.

15. The infrared sensor system of claim 12, said infrared sensor elements arranged on a single circuit board.

16. The infrared sensor system of claim 12, said infrared sensor elements arranged on a plurality of circuit boards.

17. The infrared sensor system of claim 12, wherein said means for preventing partitions the field of view vertically into upper and lower portions and horizontally into left, middle, and right portions.

* * * * *